United States Patent Office 2,831,853
Patented Apr. 22, 1958

2,831,853
MANUFACTURE OF SIZING

Kenneth P. Satterly, Clinton, Iowa, assignor, by mesne assignments, to Standard Brands Incorporated, New York, N. Y., a corporation of Delaware No Drawing. Application October 7, 1953
Serial No. 384,778

6 Claims. (Cl. 260—233.3)

This invention relates to the chemical treatment of starch in the manufacture of modified starch suitable for use as sizing for textiles and paper.

For the sizing of textiles, a sizing material is desired which will lay the fibers of the yarn and confer increased strength upon the sized fibers. With the advent of some of the new synthetic fibers, such as viscose rayon, for example, it was found that traditional sizing materials heretofore satisfactory when used with cotton were not satisfactory when used with the new fibers. The new fibers were not coated uniformly and were not uniformly strengthened by the sizing.

The general object of this invention is to produce from starch a new sizing material suitable for use on natural fibers and synthetic fibers.

My invention involves the treatment of starch with gluconic acid or delta gluconolactone. Either gluconic acid or delta gluconolactone may be used. Since delta gluconolactone hydrolyzes in water to produce gluconic acid, the term gluconic acid as used in this patent specification and the claims implies the use of either material.

In the practice of the invention it is found that satisfactory results are obtained by preparing a slurry of starch in water, the slurry having a density within the range of 5 to 24° Baumé, the optimum density being 18° Baumé. This starch slurry is treated with a quantity of gluconic acid, employing 2½ to 50% of the acid, based on the weight of the starch dry substance. For best results, about 10% gluconic acid appears desirable. The slurry is preferably heated from room temperature up to about 130° F., although the temperature may range as high as 140° F. If the starch product is to be subsequently removed from the slurry as by filtering, for example, and dried, the temperature should be kept below the gelatinization point of the starch to facilitate filtering. The desired reaction of the acid on the starch can be secured in about two hours, at a temperature in the neighborhood of 130° F. and using about 10% gluconic acid. A longer reaction period, up to about twenty hours, may be employed with good results and is desirable, especially if a smaller percentage of gluconic acid is used, or if the density of the starch slurry is much lower than 18° Baumé.

To facilitate the reaction of the gluconic acid with the starch, I preferably use an acid catalyst, selected from the group consisting of nitric, sulfuric, phosphoric, and hydrochloric acids. Among these, sulfuric acid is preferred. The catalyst may be used in concentrations of 0.002 to 0.25%, based on the dry weight of the starch. Preferably, 0.02% of the catalyst is used. However, if desired, the catalyst may be omitted.

After the reaction is completed, the slurry may be used directly for its intended purpose, from which to prepare sizing material, but if desired the acidic reactants may first either be neutralized with an alkaline material and/or filtered and washed with water until the pH of the starch is raised to within the range of 5.0–7.0. In many instances it will be desirable to filter and dry the product prior to its ultimate use.

As an example, 200 grams of 50% gluconic acid solution was added to 2740 ml. of 18° Baumé starch slurry containing about 1,000 grams of dry substance starch, together with 0.20 gram of concentrated sulfuric acid. The temperature of the mixture was raised to 130° F. and maintained at this temperature for about twenty hours. It was then filtered and washed with water on the filter until the modified starch showed a pH of 6.0 to 6.5. The product was then dried and prepared for the market in the conventional manner.

The exact nature of the reaction between the gluconic acid and the starch is not presently known. What is known is that a considerable portion of the gluconic acid employed is recoverable from or in the filtrate, indicating that the gluconic acid is not all used up in the reaction. The recovered acid in or apart from the same filtrate may be used in succeeding starch slurries. What further is known is that sizing made from this new starch product is superior for use with some synthetic fibers such as viscose rayon.

This dried material when about to be used as sizing will be prepared in accordance with conventional methods, that is, it will be cooked in water to a thin paste and cast as a film on the fibers. Experience with this product has shown that the films produced are more flexible, of greater clarity, and especially of higher tensile strength, and that they are more effective in sizing the synthetic fibers than other heretofore known sizing materials prepared from starch.

Having described my invention, I claim:

1. A method of treating starch to condition it for use as a sizing paste comprising reacting a water slurry of starch having a density between 5° and 24° Bé. with gluconic acid in the proportion of 2½ to 50% of gluconic acid, based on the dry weight of the starch, in the presence of an acid catalyst selected from the group consisting of nitric, sulfuric, phosphoric, and hydrochloric acids while heating the slurry to an elevated temperature above room temperature but below the gelatinization temperature of the starch for at least about two hours, and filtering and drying the reacted starch product.

2. A method of treating starch to condition it for use as a sizing paste comprising reacting a water slurry of starch at a concentration corresponding to a density from 5 to 24° Baumé with gluconic acid at a concentration of 2.5%–50%, based on the weight of the starch in the presence of a catalyst selected from the group consisting of nitric, sulfuric, phosphoric, and hydrochloric acids in the amount of 0.002%–0.250%, at a temperature between room temperature and about 140° F., but below the gelatinization temperature of the starch in said slurry, for a period of from two to twenty hours, and thereafter filtering, washing with water until the pH has reached 6.0 to 6.5, and drying the reacted starch product.

3. A method of treating unmodified starch to condition it for use as a sizing paste comprising reacting a water slurry of starch at 18° Baumé density with an amount of gluconic acid equal to 10% of the dry weight of the starch in the presence of a catalyst consisting of sulfuric acid in the amount of 0.02%, based on the weight of the starch at a temperature of 130° F. for a period of about two hours, and thereafter filtering, washing with water until the pH has reached 6.0 to 6.5, and drying the reacted starch product.

4. A method of treating starch to condition it for use as a sizing material comprising heating a water slurry of starch having a density between 5° and 24° Bé. to a temperature in a range above room temperature admixed with gluconic acid in the proportion of 2½% to 50% of acid, based on the weight of the dry starch substance, and continuing the heating of the mixture for at least about two hours.

5. A method of treating starch to condition it for use as a sizing material comprising reacting a water slurry of starch having a density between 5° and 24° Bé. with gluconic acid in the proportion of 2½ to 50% of gluconic acid, based on the dry weight of the starch, in the presence of an acid catalyst selected from the group consisting of nitric, sulfuric, phosphoric, and hydrochloric acids while heating the slurry to an elevated temperature above room temperature but below the gelatinization temperature of the starch for at least about two hours.

6. A method of treating starch to condition it for use as a sizing material comprising heating to a temperature range above room temperature but below the gelatinization temperature of the starch, a water slurry of starch having a density between 5° and 24° Bé. while admixed with gluconic acid in the proportion of 2½% to 50% of acid, based on the weight of the dry starch substance and continuing the heating for at least about two hours.

References Cited in the file of this patent

UNITED STATES PATENTS

| | | |
|---|---|---|
| 1,908,485 | Meigs | May 9, 1933 |
| 2,660,577 | Kerr et al. | Nov. 24, 1953 |
| 2,713,307 | Adams | July 19, 1955 |